(No Model.)
I. W. PARMENTER.
PULVERIZING MACHINE.
No. 263,571. Patented Aug. 29, 1882.
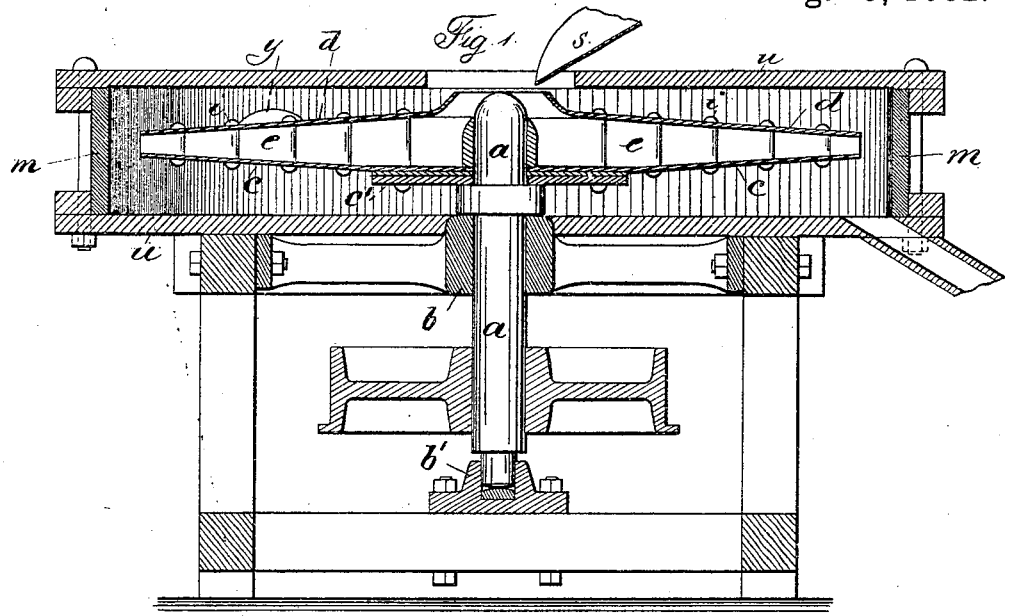
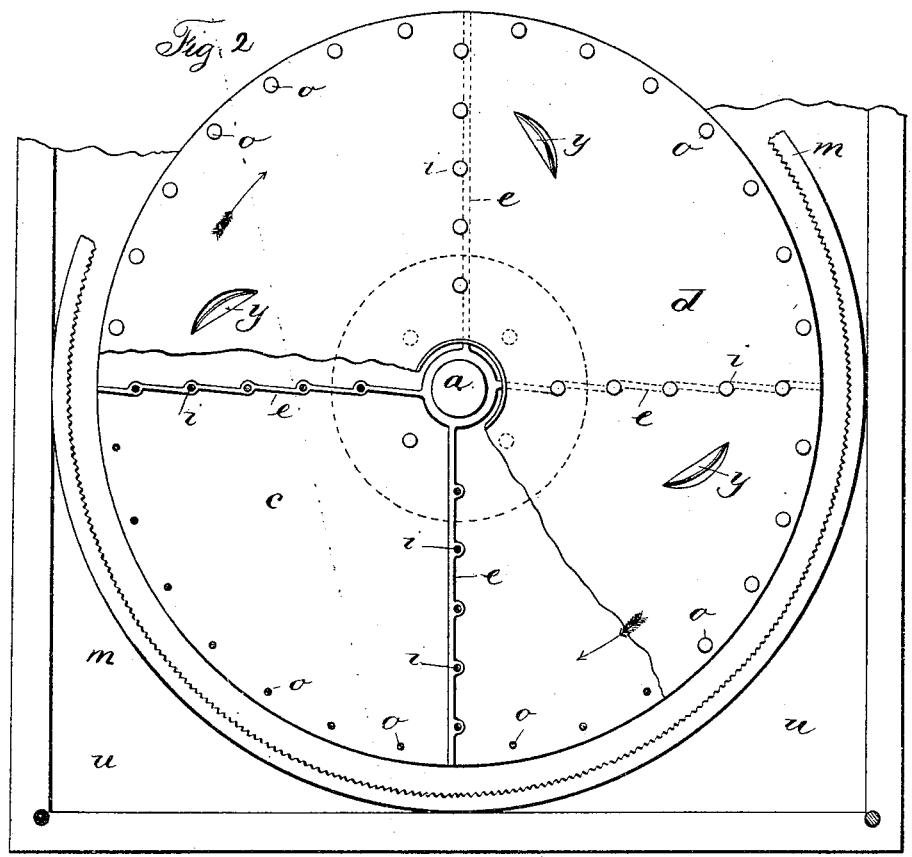
Witnesses
J. Haib
Chas H. Smith
Inventor
Isaac W. Parmenter
per Lemuel W. Serrell
atty
N. PETERS, Photo-Lithographer, Washington, D. C.

UNITED STATES PATENT OFFICE.

ISAAC W. PARMENTER, OF NEW YORK, N. Y.

PULVERIZING-MACHINE.

SPECIFICATION forming part of Letters Patent No. 263,571, dated August 29, 1882.

Application filed June 14, 1882. (No model.)

*To all whom it may concern:*

Be it known that I, ISAAC W. PARMENTER, of the city and State of New York, have invented an Improvement in Pulverizing-Machines, of which the following is a specification.

Centrifugal machines have been made in which the material to be pulverized has been hurled against a ring or abutment.

My invention is made for lessening the weight and cost of machines of this general character, and at the same time strengthening them and preventing the risk of the centrifugal force causing the metal to fly apart.

In the drawings, Figure 1 is a section of the apparatus. Fig. 2 is a plan view, partially in section, and Fig. 3 is an elevation of the disks at the end of one of the hurling-arms.

I have represented the apparatus as revolving horizontally on a vertical shaft; but the improvement is equally available when the shaft is horizontal and the centrifugal disks are vertical. I will, however, describe the device in the form shown in the drawings.

The shaft $a$ is supported by bearings $b$ $b'$ in a suitable frame, and it is rotated at the desired speed by competent power. Upon this shaft $a$ there is a flange or hub, $c'$, which is formed with or connected to a disk, $c$, of sheet-steel or other metal possessing the required strength. There is a second disk, $d$, that has a central opening, the edges of which are flaring, and the disks are dishing, so as to be nearest together at the outer edges. Between these disks $c$ and $d$ there are radial, or nearly radial, hurling-arms $e$ $e$. There should be three or four of these. I have shown four, and they are preferably connected at their inner ends to the main shaft or to an eye that surrounds the same, and the disks are riveted or screwed together by rivets or screws $i$ passing through them and through the arms $e$ $e$; or these parts may be connected in any other suitable way. The openings between the disks at their edges are determined by the width of the arms $e$ $e$, and these must be of sufficient size to give a free discharge to the grain, ore, phosphates, or other materials that are thrown off centrifugally against the circular abutment $m$.

In order to lessen the space through which air will pass off at the edges of the disks I bring such edges together, or nearly so, at the portions that are between the arms and rivet, or otherwise fasten such disks together, as at $o$. This leaves triangular openings at each side of each arm, so that the materials that are fed into the central opening of the disk $d$ are carried around by and thrown off from the ends of the hurling-arms $e$ $e$, and strike with the violence due to the momentum against the interior surface of the abutment $m$, and are broken by the concussion.

The material is to be passed into the centrifugal pulverizer from the chute $s$ in a regular supply, and it is desirable to surround the apparatus with a case, as at $u$, to catch the pulverized material. There should be a screen in the upper part of the case to allow the air to pass out and to retain the pulverized material.

If desired, the disk $d$ may have wind-catching segments at $y$, the same being formed of hoods riveted upon the disk adjacent to openings through the disk; or the metal of the disk may be cut and bent up to form such hoods, which, as the pulverizer revolves, travel through the air with the open end or mouth catching the air and passing it into the interior to accelerate the discharge of the material to be pulverized, and augment the force of the blow against the abutment by which the material is shattered.

The abutment may be corrugated on its interior and revolved in the opposite direction to the disks, if desired, so as to increase the impact of the materials that are thrown off by centrifugal force.

I claim as my invention—

1. In a centrifugal pulverizing apparatus, the disks $c$ and $d$, of sheet metal, having a dishing shape, so as to be nearest together at their edges, and the tapering hurling-arms $e$, rigidly connected between the disks, in combination with the circular abutment, substantially as set forth.

2. In a centrifugal pulverizing apparatus, the combination, with the shaft and its supports, of radial hurling-arms and sheet-metal disks connected at the edges of the arms, the outer edges of the disks being united for a portion of the distance between the ends of the radial arms, leaving openings adjacent to the ends of such arms, substantially as set forth.

3. In a rotary centrifugal pulverizer, the combination of the hurling-arms, the sheet-metal disks, and the revolving shaft to which the same are connected, with means for supplying the material to be pulverized near the said shaft, and wind-catching segments to augment the speed of the issuing material, and an abutment against which the same strikes, substantially as specified.

Signed by me this 10th day of June, A. D. 1882.

I. W. PARMENTER.

Witnesses:
GEO. T. PINCKNEY,
CHAS. H. SMITH.